M. B. BURGESS.
SHUTTER MECHANISM.
APPLICATION FILED FEB. 20, 1918.
1,281,131.
Patented Oct. 8, 1918.
2 SHEETS—SHEET 1.
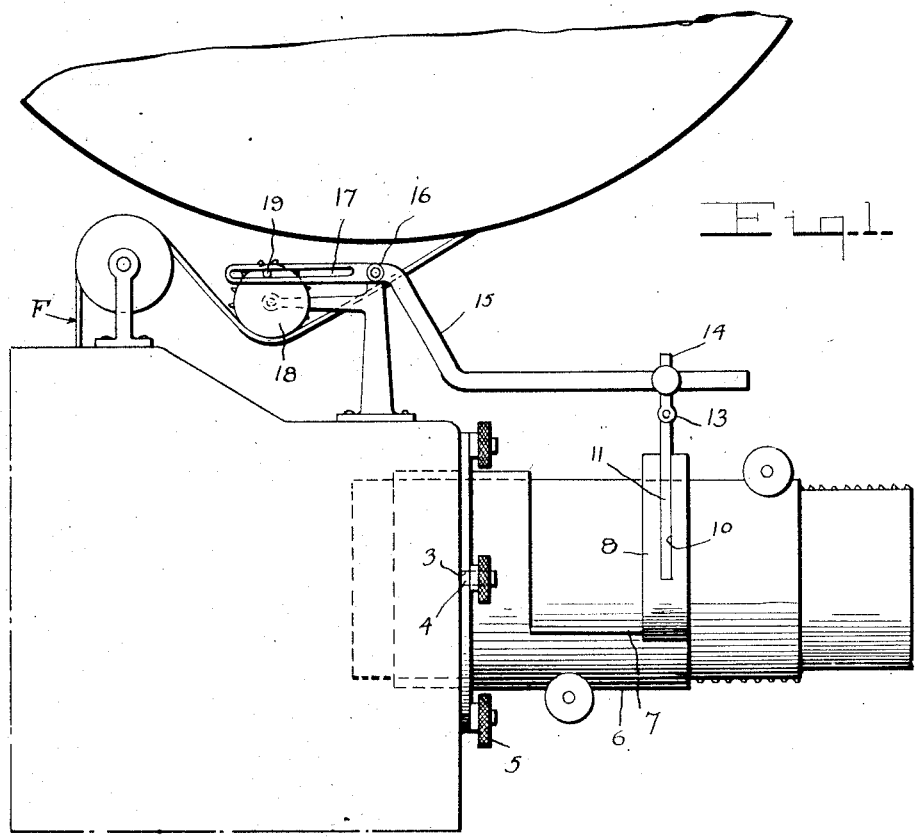
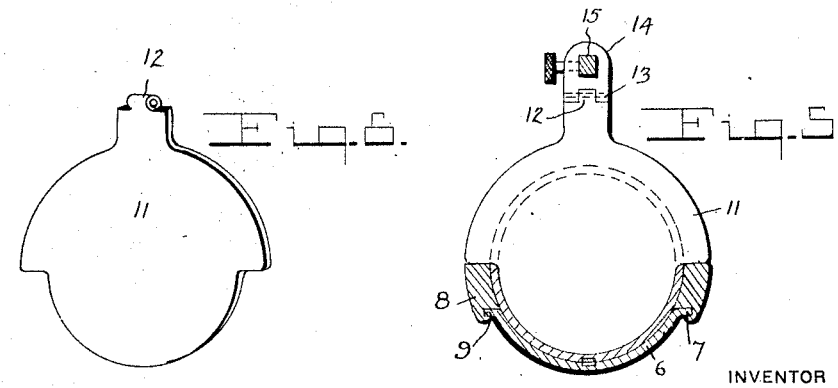
INVENTOR
Mortimer B. Burgess
WITNESSES
BY
ATTORNEY

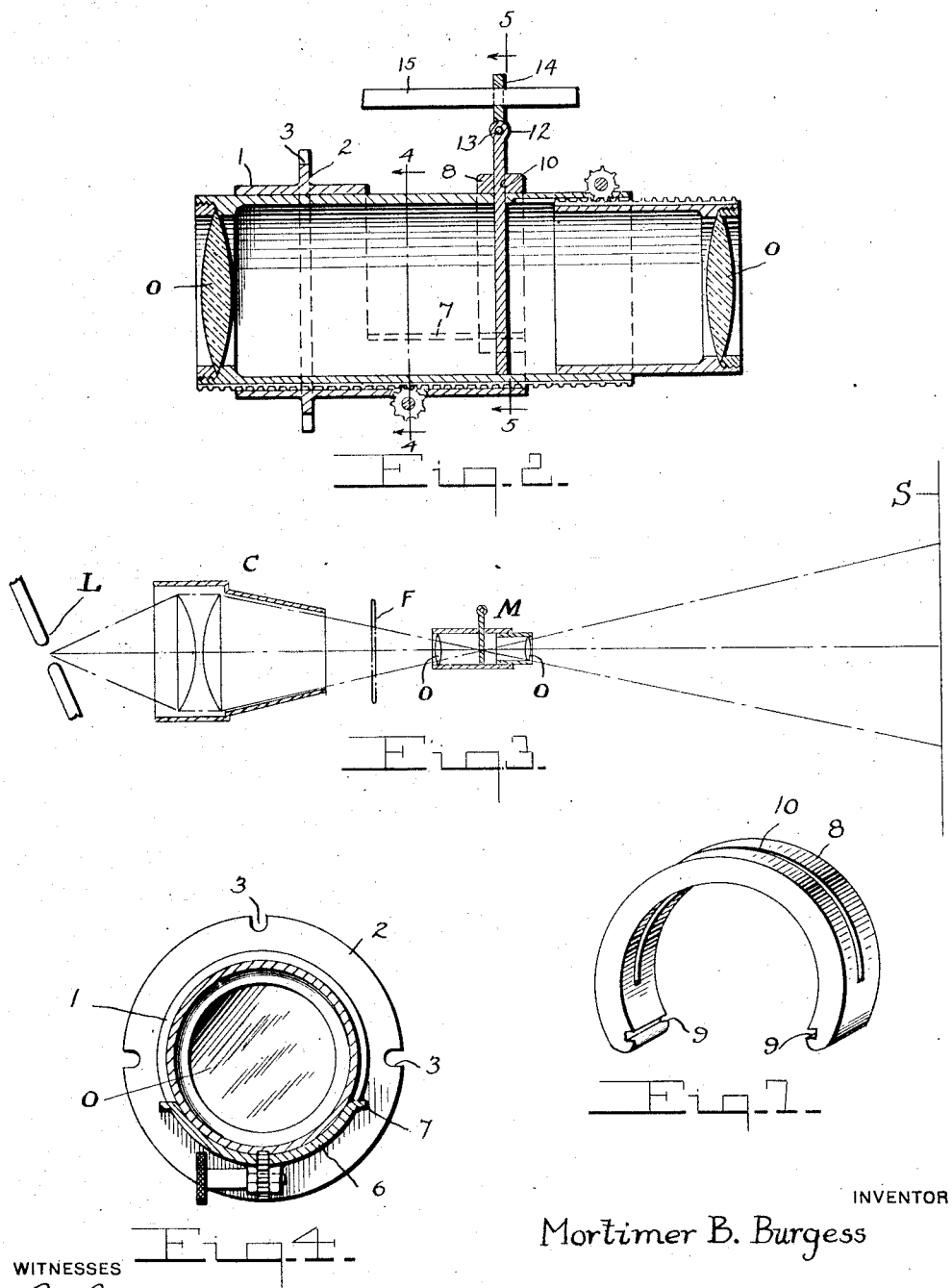

UNITED STATES PATENT OFFICE.

MORTIMER B. BURGESS, OF JAMAICA, BRITISH WEST INDIES.

SHUTTER MECHANISM.

1,281,131. Specification of Letters Patent. Patented Oct. 8, 1918.

Application filed February 20, 1918. Serial No. 218,278.

*To all whom it may concern:*

Be it known that I, MORTIMER B. BURGESS, a subject of the King of Great Britain, residing at Adelphi post-office, Jamaica, British West Indies, have invented certain new and useful Improvements in Shutter Mechanism, of which the following is a specification.

This invention relates to optics, and more especially to the shutters of motion picture machines; and the object of the same is to overcome flicker of the screen by mounting the shutter at the point of convergence of the rays of light within the casing or mounting of the objective lens. I preferably actuate the shutter by the movement of the film, and as shown herein this is done by employing a crank wheel having teeth engaging the holes in the film, and causing the crank to swing a rock lever which is connected with the shutter.

Details of my preferred construction are set forth herein and reference is made to the drawings, wherein:—

Figure 1 is a side elevation of this device complete, and so much of a motion picture apparatus as is necessary for a clear understanding, Fig. 2 is a central vertical longitudinal section of the lens mounting showing the shutter therein, Fig. 3 is a diagram to be referred to hereinafter, Figs. 4 and 5 are cross sectional views on the lines 4—4 and 5—5 respectively of Fig. 2, Fig. 6 is a perspective detail of the shutter itself, Fig. 7 is a perspective detail of the shutter guide.

Referring first to the diagram shown in Fig. 3 let L designate the source of light, C the casing containing the condensers, F the line across the light rays along which moves the film, M the mounting for the objective lenses shown at O in Fig. 2, and S the screen. The lenses are adjustable by rack and pinion mechanism as clearly indicated and as shown in Figs. 1 and 2, and the entire mounting is held to the motion picture apparatus by means of a housing 1 having an annular rib or flange 2 cut with notches 3 through which latter pass screws 4 which receive thumb nuts 5. The housing leads along beneath the lens mounting M in a lip 6 whose edges are outturned as shown at 7 for a purpose yet to appear. Over the lens mounting I pass a shutter guide 8 best seen in perspective in Fig. 7, having transverse grooves 9 in its lower ends which receive the outturned portions 7 of said lip 6 and by means of which the entire guide is held in place. Said guide also has in its body an upright slot 10, and a corresponding slot is cut through the upper half of the lens mounting M. Through these slots is dropped down into the mounting a shutter indicated at 11 in Fig. 1, the same having a knuckle 12 at its upper end, and passing astride said knuckle are other knuckles 13 at the lower end of a clip member 14 (see Fig. 5), the knuckles being pivotally connected by a pivot pin as indicated. Said clip member is therefore hingedly connected with the shutter, and the member itself has an opening which is movably mounted on one arm of a lever 15 which is fulcrumed at 16 on a fixed support and has its other arm slotted as shown at 17. The numeral 18 designates a moving part of the machine synchronized with its timing, it being shown herein as a sprocket wheel whose teeth are engaged by the holes in the film F, and 19 is a crank or wrist pin in this sprocket wheel which is mounted within the slot 17. The other parts of the mechanism as illustrated are so well known to those familiar with this art that they need no further explanation.

The uses and advantages of this device will now be as follows:—The light emanating from the proper source at L passes through the condenser lenses at C and then through the film F and into the lens mounting M, where the rays of light converge or, according to the diagram in Fig. 3, appear to cross each other before they continue onward through the opposite lens O and are projected onto the screen S. At this point of convergence my shutter is disposed, and my reason for placing it here is as follows. The cause of flicker in most motion picture machines is the fact that one picture shifts on the screen to allow the succeeding picture to take its place. This shifting is apparently overcome by the ordinary use of a shutter in the machine which cuts off the rays of light passing through the lenses, but shutters as now commonly employed only minimize the flicker to an extent, because they have an objection of their own. That is to say, while the shutter is moving through the nearer edge of the ray of light, the opposite edge still throws the remainder of the picture on the screen, and the sustained luminosity of the picture really is the vibration or flicker thereof. My invention seeks to cut off the whole of the rays of light instantaneously, and in order to effect this I locate the shutter at the point of convergence of the rays where said rays apparently cross each other, and a very small movement of the shutter will be sufficient. My invention is applicable to objective lenses of the present grade and sizes, and is capable of being attached to moving picture machines as now put on the market, it being only necessary to remove their shutter and to mount my improved shutter on the lens mounting and at a point coincident with the convergence of the rays of light as shown.

Another feature of this invention is that the shutter is caused to work intermittently and in synchronism with the movement of the machine for the exposure and the non-exposure of the pictures, by reason of its being actuated in timed relation to or directly by the movement of the film itself through the rock lever and connections described above. Therefore the action of the shutter will always correspond with the speed of the film, and the shutter will start or stop its movement as the film is started or stopped. While I do not wish to be limited to the details herein set forth, the drawings do show one practical embodiment of my invention which may be applied to motion picture machines and lenses now in common use, and with the least change.

What is claimed is:—

1. The combination with a motion picture machine, the light condensers, and the objective lens mounting and lenses; of a shutter disposed within the mounting, a lever connected with the shutter, and means for moving the lever in synchronism with the timing of the machine.

2. The combination with a motion picture machine, the light condensers, and the objective lens mounting and lenses; of a shutter disposed within said mounting at the point of convergence of the light rays, a lever connected with the shutter, and means for swinging the lever and actuating said shutter at a speed proportionate to the speed of the film.

3. The combination with a motion picture machine, the light condensers, and the objective lens mounting and lenses; of a shutter disposed within said mounting at the point of convergence of the light rays, a rock lever pivoted between its ends on a support and having one arm connected with said shutter and its other arm slotted, and a sprocket engaged by the film and having a wrist-pin movably mounted in said slot, for the purpose set forth.

4. The combination with an objective lens mounting having a slot at its mid-length through its upper side, a support for said mounting having a lip standing beneath it and outturned at its sides, and a slotted lens guide passing over the top of the mounting and having grooves engaging said outturned portions of the lip; of a shutter movably mounted through said guide and the slot in the mounting, and means for moving the shutter proportionate to the speed of the film.

5. In a motion picture machine, the combination with the objective lens mounting having a slot through its upper side, a support for the mounting, and a shutter guide passing over the mounting and carried by the support; of a shutter movably mounted through said guide and slot, a lever, a clip adjustable on the lever, hinge connections between the clip and shutter, and means for swinging the lever in synchronism with the intermittent movement of the film.

In testimony whereof I affix my signature in presence of two witnesses.

MORTIMER B. BURGESS.

Witnesses:
D. A. CORINALDI,
C. M. CLARK.

Copies of this patent may be obtained for five cents each, by addressing the "Commissioner of Patents, Washington, D. C."